United States Patent [19]

Cobb et al.

[11] 4,030,566

[45] June 21, 1977

[54] HYDRAULIC SYSTEM FOR ROCK BREAKER

[75] Inventors: Delwin E. Cobb; George J. Jackson; Richard E. Livesay, all of Peoria County; Orrin A. Stemler, Tazewell County, all of Ill.

[73] Assignee: Caterpillar Tractor Co., Peoria, Ill.

[22] Filed: Oct. 28, 1975

[21] Appl. No.: 626,384

[52] U.S. Cl. .............................. 184/6.2; 184/6.13; 184/6.23
[51] Int. Cl.² .......................................... F01M 3/00
[58] Field of Search ................... 299/37; 184/6, 6.2, 184/6.13, 6.23; 188/299

[56] References Cited

UNITED STATES PATENTS

| | | | |
|---|---|---|---|
| 1,674,103 | 6/1928 | Frederick | 184/6.2 |
| 2,094,301 | 9/1937 | Pitt | 188/299 |
| 2,531,319 | 11/1950 | Briggs | 184/6.23 |
| 3,554,322 | 1/1971 | Deutschmann | 184/6.2 |
| 3,590,953 | 7/1971 | Wellauer | 184/6.2 |
| 3,868,145 | 2/1975 | Cobb | 299/37 |

FOREIGN PATENTS OR APPLICATIONS 523,203   7/1940   United Kingdom ............... 184/6.2

Primary Examiner—Samuel Feinberg
Attorney, Agent, or Firm—Phillips, Moore, Weissenberger, Lempio & Majestic

[57] ABSTRACT

A lubricating and damping system for mechanisms which undergo large changes in orientation during operation is disclosed. The system includes a scavenge compartment built into the housing of the system and a plurality of scavenge pumps mounted within the housing having separate inlets so located that at least one of the inlets is submerged within the lubricating oil regardless of the orientation of the housing with the oil picked up by the scavenge pumps delivered through deaeration means and into a collection tank. A lubrication pump draws the oil from the collection tank and supplies it for lubrication of the mechanism and for the damping means of the system.

7 Claims, 7 Drawing Figures

HYDRAULIC SYSTEM FOR ROCK BREAKER

BACKGROUND OF THE INVENTION

The present invention relates generally to hydraulic systems and pertains particularly to the lubricating and damping system for a mechanically driven impact rock breaker.

Many mechanically driven apparatus such as the rock breaker disclosed in U.S. Pat. No. 3,868,145, issued Feb. 25, 1974 to Cobb et al and assigned to the assignee hereof employ mechanical mechanisms which are orientable into a number of different positions. These mechanical apparatus require continuous lubrication of bearings or the like to prevent failure. If the lubricating system is self-contained, it must be capable of properly functioning in many different orientations of the mechanism.

Preferably the lubricating fluid is circulated within the system to enhance the lubrication of the bearings as well as for filtering and cooling the lubricating fluid as well as assisting in cooling the machine. The lubricating system circulating path will normally have a volume exceeding that of the volume of lubricating fluid therein. Thus, a large volume of air will fill the spaces not taken up by the oil. For this reason, when the mechanism undergoes various orientations one or more inlets to its circulating pumps may not be submerged in oil and the pump may take in a volume of air.

In order to insure proper lubrication, it is essential that a continuous flow of lubricating oil itself be supplied under pressure to the bearings within the system. Should sufficient air get within the oil, the supply of oil to the bearings can become interrupted, thus, resulting in damage to the bearings of the system.

In order to maintain an oil flow, the pump or pumps must continuously draw in a quantity of oil from the sump or reservoir. Since the oil will always flow to the lowest side of the reservoir when the machine is tilted in any one of a number of operating positions, the oil will flow to the low side at that one position. Thus, an inlet to a pump must always be submerged in the oil in order to draw in a supply of oil. If a plurality of inlets are used, it is likely that one or more of the inlets will become open to the volume of air over the oil in the tank from time to time during operation of the machine. Thus, the pump having such an inlet open to the air will draw air into the pump resulting in a mixing of the air with the oil within the system.

SUMMARY AND OBJECTS OF THE INVENTION

Accordingly, it is a primary object of the present invention to overcome the above problems of the prior art.

Another object of the present invention is to provide a continuous flow lubricating system that is capable of supplying a continuous uninterrupted flow of lubricating oil regardless of the orientation of the machine in which the system is mounted.

A further object of the present invention is to provide a continuous oil lubricating system having means to remove air from the oil prior to supplying it to bearings to be lubricated.

A still further object of the present invention is to provide a combined lubricating and damping system means to insure a continuous supply of oil to the system regardless of the orientation of the machine and with means to insure adequate supply of oil for the damping means without starving the lubricating means.

In accordance with the primary aspect of the present invention, a machine that is mounted for operation in numerous different orientations about a horizontal axis or with respect to the horizontal axis is provided with a lubricating system that is operative to maintain a continuous supply of lubricating oil to the bearings of the system. Because of the various orientations of the machine, there is provided a plurality of inlets through a plurality of pumps, such inlets being located in a scavenge tank such that one such inlet is always submerged in the oil regardless of the orientation of the machine. Also provided are means to eliminate air from being trapped within the oil and damping means supplied with oil from the lubricating system. The damping means includes accumulator means to insure that the damping means does not starve the lubricating system.

BRIEF DESCRIPTION OF THE DRAWINGS

The above and other objects and advantages of the present invention will become apparent from the following description when read in conjunction with the drawings, wherein.

DETAILED DESCRIPTION OF THE PREFERRED EMBODIMENT

Figure 1:
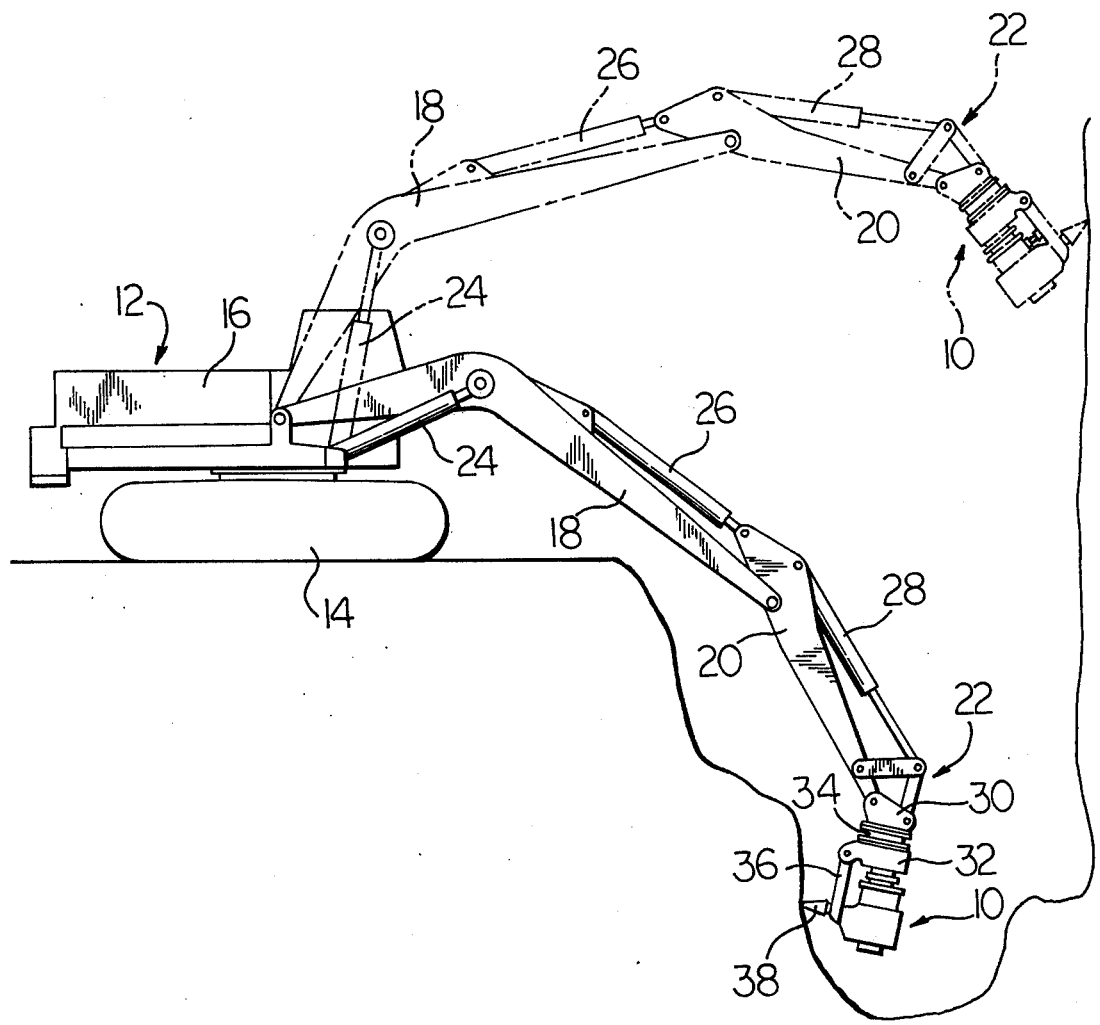
FIG. 1 is a side elevational view of a machine embodying the present invention.

Referring now to the drawings and particularly to FIG. 1, there is illustrated an impact fracturing apparatus for which the present invention was devised shown mounted on the outer end of the boom of a hydraulic excavator. The impact fracturing apparatus, generally designated by the numeral 10, is mounted on the outer end of the linkage of an excavator generally designated by the numeral 12. The excavator is the usual type comprising an undercarriage 14, a rotatable upper structure 16 that is rotatable 360 degrees around the vertical axis through the undercarriage. The upper structure has connected thereto the usual bucket linkage assembly generally comprisisng a boom 18, a stick 20 and the usual bucket tilt linkage 22 at the outer end of the stick. These linkages are manipulted in a known manner by suitably hydraulically powered jacks or motors 24,26 and 28 respectively. The impact fracturing apparatus 10 is designed to be fitted to the linkage when the bucket is removed, and comprises generally a base member 30 to which is rotatably mounted a housing 32 containing the internal structure of the apparatus to be described. The housing 32 is secured by means of a swivel joint arrangement 34 including hydraulic driving means for rotating the housing portion 32 substantially a number of degrees which may be anywhere from 90° to 360° about its axis with respect to the base member 30. It will also be appreciated that the base member 30 is pivotal on the end of stick 20 in excess of 180° with respect thereto and may be as much as 270° about its pivot point to the end of the stick 20. This arrangement, of the impact fracturing apparatus in combination with the excavator and its linkage, provides an extremely versatile machine which may be used in a number of situations such as illustrated wherein it is impossible to reach by any other machines. The pivot support of the linkage, as well as a rotatable swivel arrangement 34, permits the manipulation of the impact apparatus to situations that are otherwise very hard to reach for excavating and for demolition work. As shown in phantom in FIG. 1, the linkage may be used to present the apparatus into position to work against a face of a cliff that cannot otherwise be reached by conventional means.

The internal mechanism of the rock fracturing apparatus stores and delivers high levels of energy impact to a fracturing shank 36 pivotally secured or mounted to the housing 32 and includes a fracturing tip or point 38 for engaging and fracturing rock and like materials.

The internal workings of the mechanism or impact apparatus 10 include numerous moving parts and the like which require lubrication. These relatively moving parts require a continuous supply of pressurized lubricating oil to maintain sufficient lubrication to prevent destruction of the bearings and the like.

Figure 2:
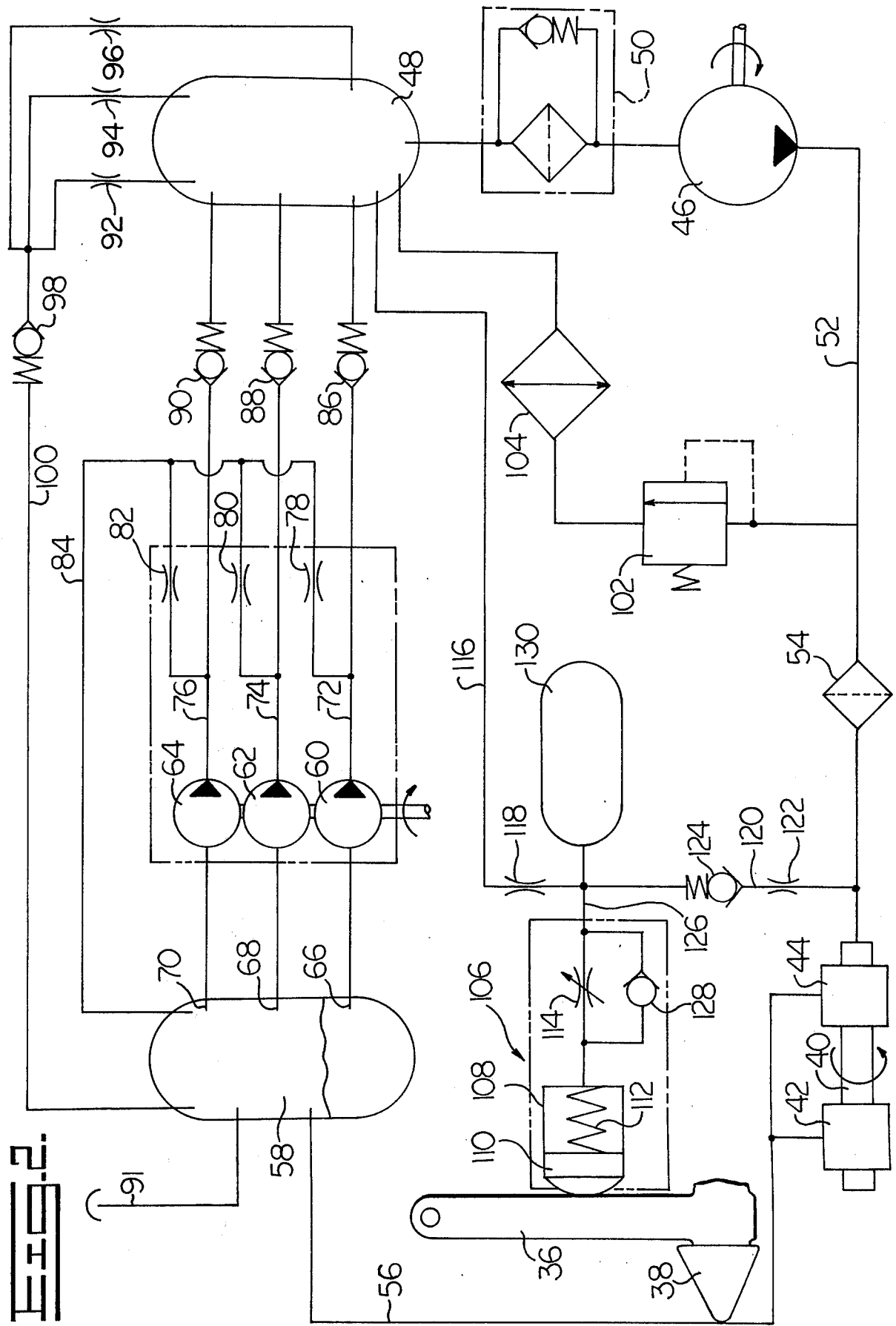
FIG. 2 is a schematic illustration of a lubricating system embodying the present invention; and, FIG. 3 is a detailed view partially in section of a machine embodying the present invention.

Turning now to FIG. 2 there is illustrated a schematic illustration of a preferred embodiment of the invention. With specific reference to FIG. 2, mechanism 10 includes therein an eccentric drive or crank shaft 40 suitably mounted in bearings 42 and 44 within the housing thereof. Lubrication of these bearings 42, 44 is accomplished by supplying pressurized lubricating oil by means of a pump 46 which draws oil from a tank 48 through a suitable inlet screen or filter assembly 50, supplies it by means of a supply line 52 to the bearings 42, 44 and any other bearings within the system. The supply line 52 may also pass through the usual filter 54 for filtering particles and the like from the lubricating oil. The lubricating oil passing through the bearings 42, 44 is returned to a scavenge tank 58 by a suitable means along a suitable passageway or the like schematically illustrated at 56. In the present system, since the bearings 42, 44 and crank shaft 40 are located within the scavenge tank, i.e., the scavenge tank is also the crank case, oil will simply pass from the respective bearings directly to the scavenge tank 58.

The scavenge tank 58 will have a larger volume than the volume of lubricating oil therein, thus, a considerable amount of air space may exist therein. This volume of air space may be greater or lesser than the volume of the oil dependisng upon the quantity of oil required. In any case, since the scavenge tank forms a portion of the apparatus itself, which is manipulated to many different orientations with respect to a horizontal plane, the drawing of oil therefrom without simultaneously drawing air presents a problem.

The oil dumped within the scavenge tank 58 is drawn therefrom for recirculation by means of a plurality of scavenge pumps 60, 62 and 64 each of which has a separate inlet 66, 68 and 70 respectively communicating at spaced positions within the scavenge tank 58. These respective inlets 66, 68 and 70 are so located within the scavenge tank that at least one inlet is submerged in oil in said compartment or scavenge tank regardless of the orientation of that tank. All of the pumps are continuously operating and since they are capable of drawing oil as well as air, the inlets which are not submerged in oil will draw air which must be eliminated from the lubricating circuit The scavenge pumps 60, 62 amd 64 deliver the oil and/or air drawn thereby from the scavenge tank along conduits 72, 74 and 76. The oil and/or air mixture then passes through deaeration means wherein any air within the oil passes through bypass orifices 78, 80 and 82 to vent line 84 which returns the air to the scavenge tank 58. Oil within the lines 72, 74 and 76 pass through check valves 86, 88 and 90 into lube supply tank to reservoir 48.

This deaeration arrangement is such that any oil delivered, for example, by pump 60 along line 72 will be sufficiently viscous to resist flow along the bypass passage 78 and will thus build up sufficient pressure to open check valve 86 to flow directly to lube tank 48. On the other hand, any air delivered along the line 72 will be sufficiently free flowing as to pass through the bypass restriction 78 more easily than through the check valve 86 and thereby be vented back by way of vent line 84 to the scavenge tank 58 where such air is then vented by way of a vent line 91 to atmosphere.

Additional deaeration means for the tank 48 may be provided in the form of restricted passage 92, 94 and 96 which communicate by way a check valve 98 with a return vent line 100 communicating back to scavenge tank 58. The restrictions 92, 94 and 96 allow the free flow of air from lube tank 48 through the check valve 98 and passage 100 but restrict the oil therethrough.

The above described lubrication arrangement is such as to insure complete and continuous flow of lubricating oil to the bearings of the apparatus regardless of the orientation thereof. A relief valve 102 prevents overpressurization of the fluid supply system by by passing oil above a predetermined minimum pressure back to lube tank 48 by way of a heat exchanger 104 for also cooling the oil.

The above disclosed lubricating system also supplies oil for the damping system for the impact ripping tool 36, 38. This damping means generally designated at 106 comprises a cylinder 108 suitably mounted on the machine and having a piston 110 mounted within the cylinder and engaging shank 36 and biasing the shank into its operative position outwardly. The piston 110 is biased by means of spring 112 contained within the cylinder 108. Movement of the piston 110 backwards upon impact of shank 36 is resisted by means of fluid within the cylinder 108. Movement of the piston 110 back within the cylinder forces fluid from the chamber of the cylinder by way of a restricted orifice 114 back to a return line 116 having a restriction 118. Oil is supplied to the cylinder 108 by means of a restricted branch passage 120 from supply line 52 having suitable restriction means 122 and inlet check 124 with branch line 126 supplying the fluid to the cylinder 108. The fluid communicated along branch 126 passes freely through check valve means 128 to the cylinder 108. The check valve prevents return fluid forcing the return fluid to pass through the variable restriction of variably restricted passage 114. An accumulator 130 is in open communication with the supply or branch line 120 for accumulating a volume of fluid therein and maintaining said supply for instantaneous supply along conduit 126 and through check valve 128 to the cylinder 108.

This arrangement prevents a starving of the lubrication system when rapid movement of the piston 110 outward, or to the left within the cylinder 108, takes place. It will be appreciated that when piston 110 moves rapidly to the left, very low pressure is generated within the cylinder 108 requiring a rapid flow of fluid to fill. Such high pressure drop could cause a pressure drop within the lubricating system and thus prevent adequate lubrication of the apparatus bearings. However, due to the inclusion of accumulator 130 such condition is prevented.

In its normal operation, the shank 36 moves to and fro about the pivot point at its upper end. This movement causes piston 110 to constantly move in and out of the cylinder 108 resulting in an intermittant damand of fluid within the cylinder 108 as the piston 110 moves outward to the left. The piston means and associated circuitry best provide damping means for the shank 36.

Figure 3:
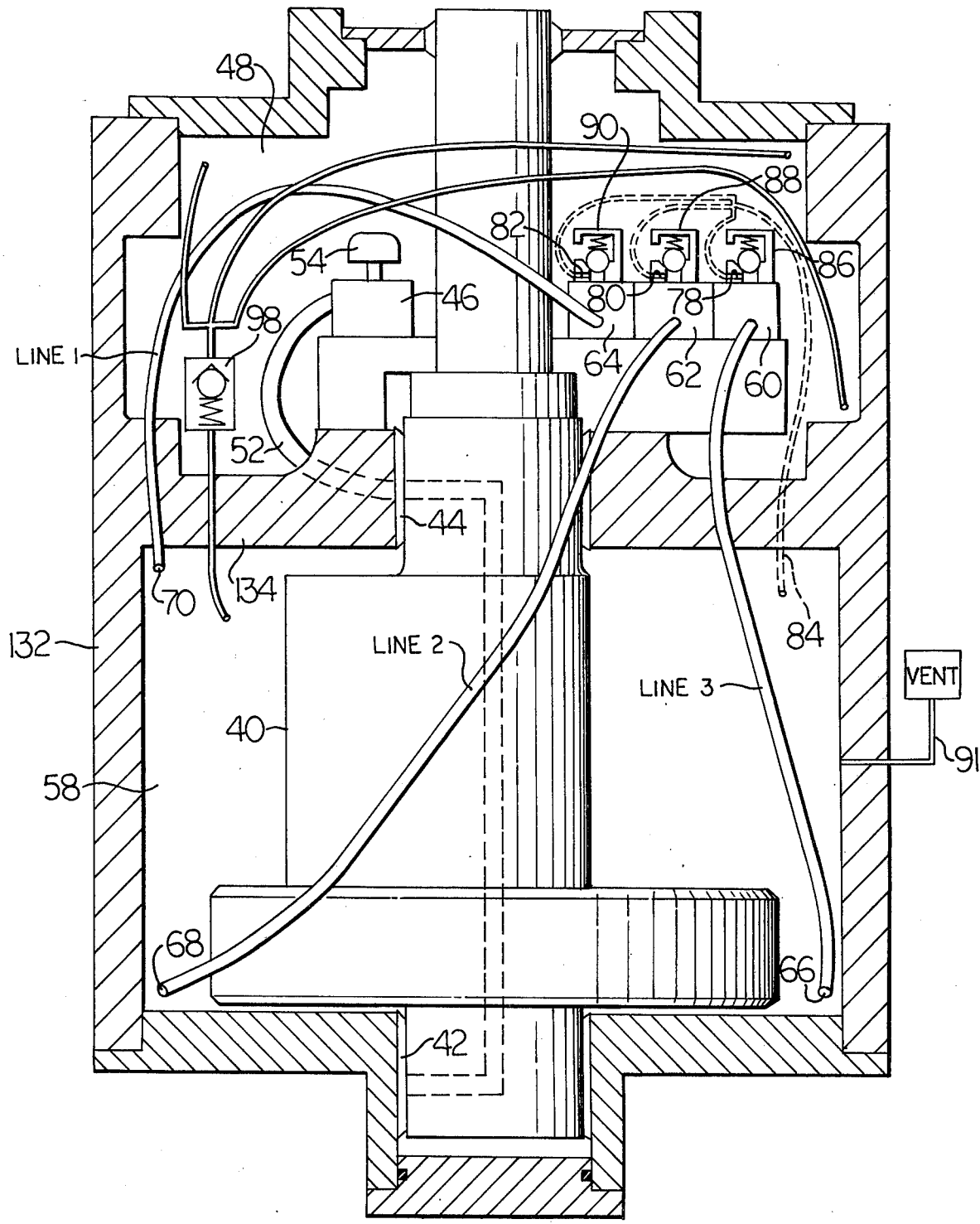

Turning now to FIG. 3 there is illustrated somewhat in schematic form the internal structure of the apparatus 10. As will be appreciated, the scavenge tank is also the crank case for the crank shaft 40 which is mounted within the bearings 42, 44. In this embodiment, the entire apparatus as well as its lube system is self-contained, that is, contained within the same housing 132. The housing is divided by partition 134 into first and second chambers comprising lube tank 48 and scavenge tank or compartment 58. The crank shaft 40 drives impact means (not shown) in a reciprocating or oscillating path for developing and imparting impact blows to the shank 36 as described in the above-referenced patent.

As will be further appreciated by viewing FIG. 3, a lube pump 46 and scavenge pumps 60, 62 and 64 are physically located within the lube tank 48. The inlets to the scavenge pump, however, are located at suitable spaced positions within the scavenge tank and communicate therefrom by suitable conduit means to the respective scavenge pumps 60, 62 and 64.

The normal orientation of the apparatus is as illustrated in FIG. 3 with the crank shaft substantially vertically illustrated. However, as will be appreciated from the above description of the mounting thereof the apparatus is such that is may pivot at least 90° and perhaps as much as 180° about an axis, a horizontal axis, perpendicular to the axis of shaft 40 and extending directly away from the observer of FIG. 3. Thus, it will be appreciated that with any tilting of the housing 132 to an angle of 45° or more from that horizontal axis and given the condition that the scavenge compartment is approximately one-half full or less then at least one of the inlets 66, 68 or 70 will not be submerged within the oil within the compartment. However, the subject system will function if at least one inlet is suberged a substantial portion of the time.

While the present invention has been illustrated by means of a single embodiment, it is to be understood that numerous changes and modifications may be made therein without departing from the spirit and scope of the invention as defined in the appended claims.

What is claimed is:

1. A lubricating system for a mechanism having movable elements and tiltable in operation at least 90 degrees from a first position of normal operation, comprising:
    a housing;
    a shaft support bearing in said housing;
    a rotatable shaft rotatably mounted in said bearing;
    a scavenge compartment in said housing for collecting oil subsequent to lubrication of said shaft;
    a plurality of scavenge pumps mounted in said housing and having separate inlets so located that at least one inlet is submerged in oil in said compartment regardless of the orientation of said housing;
    an oil collection tank for receiving oil from said scavenge pumps;
    deaeration means disposed between said scavenge pumps and said collection tank for removing air from said oil prior to delivery of said oil to said tank;
    a lubrication pump for drawing oil from said tank and supplying a quantity of said oil for lubricating said shaft; and
    vent means for communicating air and vapors from said oil collection tank to said scavenge compartment.

2. The lubricating system of claim 1 wherein said deaeration means comprises check valve means and bypass vent means for venting air from oil pumped from said scavenge compartment.

3. The lubricating system of claim 2 wherein said vent means includes a return line for communicating said bypass vent means to said scavenge tank.

4. The system of claim 2 wherein said vent bypass means includes a restricted passage upstream of said check valve means.

5. The system of claim 1 in combination with damping means for a work tool, said damping means receiving oil from said lubrication pump means.

6. The system of claim 5 including accumulator means for accumulating a supply of oil under pressure for said damping means; and,
    restriction means between said accumulator means and the supply line from said lubrication pump means for restricting the flow of oil to said accumulator means.

7. A lubricating system for a mechanism having movable elements and tiltable in operation at least 90 degrees from a first position of normal operation, comprising :
    a housing;
    a shaft support bearing in said housing;
    a rotatable shaft rotatably mounted in said bearing;
    a scavenge compartment in said housing for collecting oil subsequent to lubrication of said shaft;
    a plurality of scavenge pumps mounted in said housing and having separate inlets so located that at least one inlet is submerged in oil in said compartment regardless of the orientation of said housing;
    an oil collection tank for receiving oil from said scavenge pumps;
    deaeration means disposed between said scavenge pumps and said collection tank for removing air from said oil prior to delivery of said oil to said tank;
    a lubrication pump means for drawing oil from said tank and supplying a quantity of said oil for lubricating said shaft;
    damping means for a work tool, said damping means receiving oil from said lubrication pump means;
    accumulator means for accumulating a supply of oil under pressure for said damping means; and
    restriction means between said accumulator means and the supply line from said lubrication pump means for restricting the flow of oil to said accumulator means.

* * * * *